(12) United States Patent
Tang et al.

(10) Patent No.: US 11,284,419 B2
(45) Date of Patent: Mar. 22, 2022

(54) COMMUNICATION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventors: Hai Tang, Guangdong (CN); Hua Xu, Ottawa (CA)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/952,898

(22) Filed: Nov. 19, 2020

(65) Prior Publication Data

US 2021/0076401 A1 Mar. 11, 2021

Related U.S. Application Data

(63) Continuation of application No. 16/401,753, filed on May 2, 2019, now Pat. No. 10,912,109, which is a
(Continued)

(51) Int. Cl.
*H04W 72/12* (2009.01)
*H04L 1/00* (2006.01)
(Continued)

(52) U.S. Cl.
CPC ........... *H04W 72/1268* (2013.01); *H04L 1/00* (2013.01); *H04L 5/0051* (2013.01); *H04W 24/10* (2013.01);
(Continued)

(58) Field of Classification Search
CPC ......... H04W 72/1268; H04W 72/1284; H04W 74/0833; H04W 24/10; H04W 64/00; H04L 1/00; H04L 5/0051
See application file for complete search history.

(56) References Cited

U.S. PATENT DOCUMENTS 6,714,557 B1    3/2004  Smith et al.
8,572,593 B2   10/2013  Vedula
(Continued)

FOREIGN PATENT DOCUMENTS

CN    102150387 A    8/2011
CN    102843893 A   12/2012
(Continued)

OTHER PUBLICATIONS

The first Office Action of corresponding Japanese application No. 2019-523027, dated Dec. 1, 2020.
(Continued)

*Primary Examiner* — Mounir Moutaouakil
(74) *Attorney, Agent, or Firm* — Ladas & Parry LLP

(57) ABSTRACT

The application discloses a communication method, a terminal device and a network device, which are suitable for determining a waveform to be used in an uplink transmission of the terminal device in various scenarios. The method includes that: a terminal device transmits first indication information to a network device, where the first indication information is used to indicate a location area in which the terminal device is currently located; the terminal device receives second indication information transmitted by the network device, where the second indication information is used to indicate a first target waveform, the first target waveform being determined by the network device from at least two optional uplink waveforms according to the location area in which the terminal device is currently located; and the terminal device performs an uplink transmission using the first target waveform.

20 Claims, 5 Drawing Sheets

Related U.S. Application Data continuation of application No. PCT/CN2016/104441, filed on Nov. 3, 2016.

(51) Int. Cl.
| | | |
|---|---|---|
| *H04L 5/00* | (2006.01) | |
| *H04W 24/10* | (2009.01) | |
| *H04W 64/00* | (2009.01) | |
| *H04W 74/08* | (2009.01) | |

(52) U.S. Cl.
CPC ....... *H04W 64/00* (2013.01); *H04W 72/1284* (2013.01); *H04W 74/0833* (2013.01)

(56) References Cited

U.S. PATENT DOCUMENTS

| | | |
|---|---|---|
| 9,253,797 B2 | 2/2016 | Fan et al. |
| 9,839,036 B2 | 12/2017 | Xue et al. |
| 2010/0034152 A1 | 2/2010 | Imamura |
| 2010/0067591 A1 | 3/2010 | Luo et al. |
| 2015/0063201 A1 | 3/2015 | Kim et al. |
| 2015/0282008 A1 | 10/2015 | Cao et al. |
| 2016/0198497 A1 | 7/2016 | Yu et al. |
| 2016/0295532 A1 | 10/2016 | Cao et al. |
| 2016/0373345 A1 | 12/2016 | Li et al. |
| 2018/0287742 A1 | 10/2018 | Feng |
| 2019/0104549 A1 | 4/2019 | Deng et al. |

FOREIGN PATENT DOCUMENTS

| | | |
|---|---|---|
| CN | 105813204 A | 7/2016 |
| EP | 2353244 A2 | 8/2011 |
| JP | 2001309425 A | 11/2001 |
| JP | 2011061591 A | 3/2011 |
| JP | 2011530837 A | 12/2011 |
| RU | 2454017 C2 | 12/2010 |
| WO | 2016184236 A1 | 11/2016 |

OTHER PUBLICATIONS

The first Office Action of corresponding Indian application No. 201917021582, dated Dec. 23, 2020.

The first Office Action of corresponding Israel application No. 266332, dated Dec. 9, 2020.

Qualcomm Incorporated: Waveform proposal for >6GHz, R1-166353 (3GPP), Mobile Competence Centre; 650, Route Des Lucioles; F-06921 Sophia-Antipolis Cedex; vol. RAN WG1, No. Gothenburg, Sweden; 20160822-20160828; Aug. 13, 2016; XP051142342.

Qualcomm Incorporated: "OFDM and SC-FDM Support for Uplink", R1-166354 (3GPP), Mobile Competence Centre; 650, Route Des Lucioles, F-06921 Sophia-Antipolis Cedex; vol. RAN WG1, No. Gothenburg, Sweden; 20160822-20160826; Aug. 13, 2016; XP051142343.

The international search report of PCT application No. PCT/CN2016/104441, dated Jul. 31, 2017.

The Extended European Search Report application No. 16920497.1, dated Dec. 12, 2019.

The First Office Action of corresponding Chinese application No. 201680090599.X, dated Jun. 22, 2020.

The First Office Action of corresponding Chilean application No. 201901209, dated May 14, 2020.

The first Office Action of corresponding Russian application No. 2019116908, dated May 19, 2020.

The first Office Action of corresponding Canadian application No. 3042591, dated May 27, 2020.

The First Office Action of corresponding Brazilian application No. BR1120190087958, dated Sep. 1, 2020.

Ths Second Office Action of corresponding Chilean application No. 201901209, dated Oct. 26, 2020.

The Notice of Allowance of corresponding Russian application No. 2019116908, dated Aug. 31, 2020.

The First Office Action of corresponding U.S. Appl. No. 16/401,753, dated Apr. 30, 2020.

The Notice of Allowance of corresponding U.S. Appl. No. 16/401,753, dated Aug. 17, 2020.

The second Office Action of corresponding Canadian application No. 3042591, dated Mar. 29, 2021.

The EESR of corresponding European application No. 21156577.5, dated May 25, 2021.

COMMUNICATION METHOD, TERMINAL DEVICE AND NETWORK DEVICE

CROSS-REFERENCE TO RELATED APPLICATIONS

This application is a continuation of U.S. patent application Ser. No. 16/401,753, filed on May 2, 2019 which is a continuation of International Application No. PCT/CN2016/104441 filed on Nov. 3, 2016. All of the aforementioned patent applications are hereby incorporated by reference in their entireties.

TECHNICAL FIELD

Embodiments of the present disclosure relate to the field of communications and, in particular, to a communication method, a terminal device, and a network device.

BACKGROUND

In existing wireless communication systems such as a long term evolution (LTE) system, a terminal device always uses one type of waveform for uplink transmissions. With the development of technologies, in future wireless communication systems, uplink transmissions may support at least two types of waveforms, so that a base station needs to decide which waveform to specifically use when it performs an uplink scheduling.

However, when the base station determines the waveform to be used in the uplink transmission, an uplink reference signal transmitted by the terminal device needs to be measured generally. In this way, if the terminal device is in a radio resource control (RRC) connected mode (RRC connected mode), a large amount of power will be consumed for the terminal device during continuous transmissions of uplink reference signals to the base station for a long time. If the terminal device does not transmit the uplink reference signals to the base station, the base station may not be able to timely track changes in the uplink reference signals of the terminal device, thereby resulting in an erroneous scheduling of the uplink transmission.

SUMMARY

Embodiments of the present disclosure provide a communication method, a terminal device, and a network device, which are suitable for determining a waveform used in an uplink transmission of the terminal device in various scenarios.

In an embodiment of a first aspect, a communication method is provided, including: transmitting, by a terminal device, first indication information to a network device, where the first indication information is used to indicate a location area in which the terminal device is currently located; receiving, by the terminal device, second indication information transmitted by the network device, where the second indication information is used to indicate a first target waveform, the first target waveform being determined by the network device from at least two optional uplink waveforms according to the location area in which the terminal device is currently located; and performing, by the terminal device, an uplink transmission using the first target waveform.

Specifically, the location area in which the terminal device is currently located may specifically refer to a location area in which the terminal device is currently located in a cell managed by the network device, and a division of the location area may depend on transmit power of the terminal device.

In an embodiment, the location area in which the terminal device is currently located includes: a cell center area, a cell edge area, or an area between a cell center area and a cell edge area.

In an embodiment, the terminal device may always transmit the first indication information to the network device after the location area in which the terminal device is currently located is determined.

In an embodiment, the terminal device may also transmit the first indication information to the network device when the terminal device determines that the location area in which the terminal device is currently located meets a reporting condition.

The reporting condition may be protocol-defined, or before the terminal device transmits the first indication information to the network device, the terminal device may receive indication information transmitted by the network device, where the indication information is used to indicate the reporting condition.

In a first possible implementation of the first aspect, the transmitting, by the terminal device, the first indication information to the network device includes: transmitting, by the terminal device, a random access request to the network device, where the random access request carries the first indication information.

At this time, in an embodiment, the receiving, by the terminal device, the second indication information transmitted by the network device may include: receiving, by the terminal device, a random access response transmitted by the network device, where the random access response carries the second indication information.

With reference to a possible implementation described above in the first aspect, in a second possible implementation of the first aspect, the random access request further carries a preamble, and where a bit occupied by the first indication information follows immediately after the preamble.

At this time, the random access request carries the preamble and the first indication information.

With reference to a possible implementation described above in the first aspect, in a third possible implementation of the first aspect, before the transmitting, by a terminal device, first indication information to a network device, the method further includes: determining, by the terminal device, a preamble corresponding to the location area in which the terminal device is currently located from at least two preambles according to a corresponding relationship between the location area and the preamble; the random access request carrying the first indication information includes: the random access request carries the preamble corresponding to the location area in which the terminal device is currently located.

In an embodiment, a corresponding relationship between the preamble or preamble set and the location area may be protocol-defined, or before the terminal device determines corresponding preamble, the terminal device may receive indication information transmitted by the network device, where the indication information is used to indicate a corresponding relationship between the preamble or preamble set and the location area.

At this time, the network device may determine, according to the preamble carried in the random access request, the location area in which the terminal device is currently located.

In this way, signaling overhead can be saved by using the preamble carried in the random access request to indicate the location area in which the terminal device is currently located.

With reference to a possible implementation described above in the first aspect, in a fourth possible implementation of the first aspect, the transmitting, by a terminal device, the first indication information to the network device includes: transmitting, by the terminal device, a scheduling request to the network device, where the scheduling request carries the first indication information.

At this time, in an embodiment, the receiving, by the terminal device, the second indication information transmitted by the network device may include: receiving, by the terminal device, an uplink grant transmitted by the network device, where the uplink grant carries the second indication information.

With reference to a possible implementation described above in the first aspect, in a fifth possible implementation of the first aspect, before the transmitting, by a terminal device, first indication information to a network device, the method further includes: measuring, by the terminal device, a downlink reference signal transmitted by the network device; and determining, by the terminal device, the location area in which the terminal device is currently located according to a result of the measurement.

With reference to a possible implementation described above in the first aspect, in a sixth possible implementation of the first aspect, the determining, by the terminal device, the location area in which the terminal device is currently located according to a result of the measurement includes: determining, by the terminal device, the location area in which the terminal device is currently located by comparing the result of the measurement with at least two threshold conditions.

In an embodiment, if the result of the measurement meets a first threshold condition of the at least two threshold conditions, for example, a path loss obtained from the measurement is lower than a first threshold value, the terminal device may determine that the terminal device is currently located in the cell center area.

In an embodiment, if the result of the measurement meets a second threshold condition of the at least two threshold conditions, for example, a path loss obtained from the measurement is higher than a second threshold, the terminal device may determine that the terminal device is currently located in the cell edge area.

In an embodiment, if the result of the measurement meets neither the first threshold condition nor the second threshold condition, for example, a path loss obtained from the measurement is between the first threshold and the second threshold, the terminal device may determine that the terminal device is currently located between the cell center area and the cell edge area.

With reference to a possible implementation described above in the first aspect, in a seventh possible implementation of the first aspect, before the determining, by the terminal device, the location area in which the terminal device is currently located according to a result of the measurement, the method further includes: receiving, by the terminal device, third indication information transmitted by the network device, where the third indication information is used to indicate the at least two threshold conditions.

With reference to a possible implementation described above in the first aspect, in an eighth possible implementation of the first aspect, the receiving, by the terminal device, the third indication information transmitted by the network device includes: receiving, by the terminal device, a broadcast message transmitted by the network device, where the broadcast message carries the third indication information.

With reference to a possible implementation described above in the first aspect, in a ninth possible implementation of the first aspect, if the first indication information indicates that the terminal device is currently located between the cell edge area and the cell center area, the second indication information is further used to instruct the terminal device to transmit an uplink reference signal to the network device; the performing, by the terminal device, an uplink transmission using the first target waveform includes: transmitting, by the terminal device, an uplink reference signal to the network device using the first target waveform according to the second indication information.

In an embodiment, if the first indication information indicates that the terminal device is currently located between the cell edge area and the cell center area, the first target waveform may be specifically DFT-s-OFDM of the at least two optional uplink waveforms.

With reference to a possible implementation described above in the first aspect, in a tenth possible implementation of the first aspect, the method further includes: receiving, by the terminal device, fourth indication information transmitted by the network device, where the fourth indication information is used to indicate a second target waveform determined by the network device from the at least two optional uplink waveforms according to the uplink reference signal; and performing, by the terminal device, an uplink transmission using the second target waveform.

In an embodiment of a second aspect, another communication method is provided, including: receiving, by a network device, first indication information transmitted by a terminal device, where the first indication information is used to indicate a location area in which the terminal device is currently located; determining, by the network device, a first target waveform from at least two optional uplink waveforms according to the location area in which the terminal device is currently located; and transmitting, by the network device, second indication information to the terminal device, where the second indication information is used to instruct the terminal device to perform an uplink transmission using the first target waveform.

In a first possible implementation of the second aspect, the location area in which the terminal device is currently located includes: a cell center area, a cell edge area, or an area between a cell center area and a cell edge area.

With reference to a possible implementation described above in the second aspect, in a second possible implementation of the second aspect, the receiving, by the network device, the first indication information transmitted by the terminal device includes: receiving, by the network device, a random access request transmitted by the terminal device, where the random access request carries the first indication information.

At this time, in an embodiment, the transmitting, by the network device, the second indication information to the terminal device includes: transmitting, by the network device, a random access response to the terminal device, where the random access response carries the second indication information.

With reference to a possible implementation described above in the second aspect, in a third possible implementation of the second aspect, the random access request further carries a preamble, and where a bit occupied by the first indication information follows immediately after the preamble.

With reference to a possible implementation described above in the second aspect, in a fourth possible implementation of the second aspect, the random access request carrying the first indication information includes: the random access request carries a preamble corresponding to the location area in which the terminal device is currently located.

At this time, the network device may determine, according to the preamble carried in the random access request, the location area in which the terminal device is currently located.

With reference to a possible implementation described above in the second aspect, in a fifth possible implementation of the second aspect, the receiving, by the network device, the first indication information transmitted by the terminal device includes: receiving, by the network device, a scheduling request transmitted by the terminal device, where the scheduling request carries the first indication information.

At this time, in an embodiment, the transmitting, by the network device, the second indication information to the terminal device includes: transmitting, by the network device, an uplink grant to the terminal device, where the uplink grant carries the second indication information.

With reference to a possible implementation described above in the second aspect, in a sixth possible implementation of the second aspect, before the network device receives the first indication information transmitted by the terminal device, the method further includes: transmitting, by the network device, a downlink reference signal to the terminal device, where the downlink reference signal is used for the terminal device to determine the location area in which the terminal device is currently located.

With reference to a possible implementation described above in the second aspect, in a seventh possible implementation of the second aspect, before the network device receives the first indication information transmitted by the terminal device, the method further includes: transmitting, by the network device, third indication information to the terminal device, where the third indication information is used to indicate at least two threshold conditions, the at least two threshold conditions being used for the terminal device to determine, according to a result of a measurement for the downlink reference signal, the location area in which the terminal device is currently located.

With reference to a possible implementation described above in the second aspect, in an eighth possible implementation of the second aspect, the transmitting, by the network device, the third indication information to the terminal device includes: transmitting, by the network device, a broadcast message to the terminal device, where the broadcast message carries the third indication information.

With reference to a possible implementation described above in the second aspect, in a ninth possible implementation of the second aspect, the determining, by the network device, the first target waveform from the at least two optional uplink waveforms according to the location area in which the terminal device is currently located includes: if the first indication information indicates that the terminal device is currently located between the cell edge area and the cell center area, determining DFT-s-OFDM of the at least two optional uplink waveforms as the first target waveform.

With reference to a possible implementation described above in the second aspect, in a tenth possible implementation of the second aspect, if the first indication information indicates that the terminal device is currently located between the cell edge area and the cell center area, the second indication information is further used to instruct the terminal device to transmit an uplink reference signal to the network device; the method further includes: receiving, by the network device, an uplink reference signal transmitted by the terminal device using the first target waveform; and determining, by the network device, a second target waveform from the at least two optional uplink waveforms according to the uplink reference signal transmitted by the terminal device.

In an embodiment, the network device may measure the uplink reference signal transmitted by the terminal device, and determine the second target waveform according to a result of a measurement.

In an embodiment, the result of the measurement may include path loss. At this time, in an embodiment, if the path loss is lower than a preset threshold value, the network device may determine OFDM as the second target waveform; otherwise, the network device may determine DFT-s-OFDM as the second target waveform.

With reference to a possible implementation described above in the second aspect, in an eleventh possible implementation of the second aspect, the method further includes: transmitting, by the network device, fourth indication information to the terminal device, where the fourth indication information is used to instruct the terminal device to perform an uplink transmission using the second target waveform.

In an embodiment, the network device may always transmit the fourth indication information to the terminal device after the second target waveform is determined.

In an embodiment, the network device may also transmit the fourth indication information to the terminal device when the second target waveform meets a preset condition, for example, the second target waveform is different from the first target waveform.

In certain aspects of an embodiment of the present disclosure, the first indication information occupies at least two bits.

In certain aspects of an embodiment of the present disclosure, the at least two optional uplink waveforms include: OFDM and DFT-s-OFDM.

In an embodiment of a third aspect, a terminal device is provided, which is configured to perform the method in the first aspect or any possible implementation of the first aspect.

Specifically, the terminal device includes units for performing the method in the first aspect or any possible implementation of the first aspect.

In an embodiment of a fourth aspect, a network device is provided, which is configured to perform the method in the second aspect or any possible implementation of the second aspect.

Specifically, the network device includes units for performing the method in the second aspect or any possible implementation of the second aspect.

In an embodiment of a fifth aspect, another terminal device is provided, including: a memory and a processor, where the memory is configured to store an instruction, the processor is configured to execute the instruction stored in the memory, and when the processor executes the instruction stored in the memory, the execution allows the processor to perform the method in the first aspect or any possible implementation of the first aspect.

In an embodiment of a sixth aspect, another network device is provided, including: a memory and a processor, where the memory is configured to store an instruction, the processor is configured to execute the instruction stored in the memory, and when the processor executes the instruction stored in the memory, the execution allows the processor to perform the method in the second aspect or any possible implementation of the second aspect.

In an embodiment of a seventh aspect, a computer readable medium is provided, which is configured to store a computer program including an instruction for performing the method in the first aspect or any possible implementation of the first aspect.

In an embodiment of an eighth aspect, a computer readable medium is provided, which is configured to store a computer program including an instruction for performing the method in the second aspect or any possible implementation of the second aspect.

Based on the foregoing technical solution, through reporting, by a terminal device, a location area in which the terminal device is currently located to a network device, determining, by the network device, a first target waveform of the terminal device from at least two optional uplink waveforms according to the location area in which the terminal device is currently located, the communication method, the terminal device, and the network device provided by the embodiments of the present disclosure can be applied to determine a waveform used in an uplink transmission in various scenarios, in particular, when the terminal device is not in the RRC connected mode, it is still possible to determine the waveform used in the uplink transmission of the terminal device, for example, the terminal device initially accesses the network device or the terminal device requests an uplink scheduling, and thus system performance is improved.

DESCRIPTION OF EMBODIMENTS

The technical solution in the embodiments of the present disclosure will be described below with reference to the accompanying drawings in the embodiments of the present disclosure.

The technical solution in the embodiments of the present disclosure can be applied to various communication systems, for example, a global system of mobile communication (GSM), a code division multiple access (CDMA) system, a wideband code division multiple access (WCDMA) system, a general packet radio service (GPRS), a long term evolution (LTE) system, a LTE frequency division duplex (FDD) system, a LTE time division duplex (TDD), a universal mobile telecommunication system (UMTS), a worldwide interoperability for microwave access (WiMAX) communication system, a future 5G system, or the like.

Figure 1:
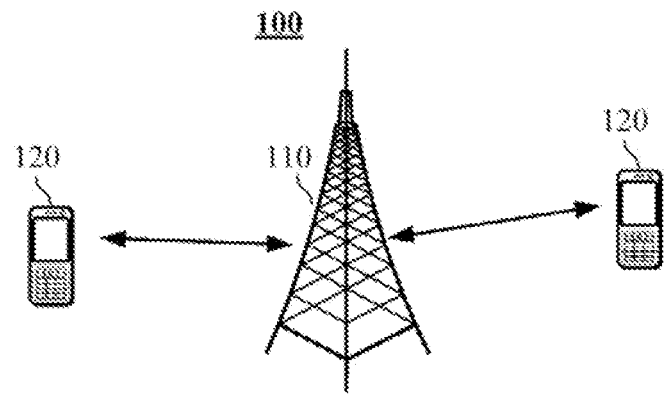
FIG. 1 is a schematic diagram of a wireless communication system applied in an embodiment of the present disclosure.

FIG. 1 shows a schematic diagram of a wireless communication system 100 applied in an embodiment of the present disclosure. The wireless communication system 100 may include a network device 110. The network device 110 may be a device communicating with a terminal device. The network device 110 may provide communication coverage for a particular geographic area and may communicate with a terminal device (such as UE) located within the coverage area. In an embodiment, the network device 110 may be a base station (BTS) in the GSM or the CDMA system, or a base station (NodeB, NB) in the WCDMA system, or an evolved base station (Evolutional Node B, eNB or eNodeB) in the LTE system, or a wireless controller in a cloud radio access network (CRAM), alternatively, the network device may be a relay station, an access point, a vehicle-mounted device, a wearable device, a network side device in a future 5G network or a network device in a future evolved public land mobile network (PLMN), or the like.

The wireless communication system 100 also includes at least one terminal device 120 located within the coverage of the network device 110. The terminal device 120 may be mobile or fixed. In an embodiment, the terminal device 120 may refer to an access terminal, user equipment (UE), a subscriber unit, a subscriber station, a mobile station, a mobile platform, a remote station, a remote terminal, a mobile device, a user terminal, a terminal, a wireless communication device, a user agent, a user device, etc. The access terminal may be a cellular phone, a cordless phone, a session initiation protocol (SIP) phone, a wireless local loop (WLL) station, a personal digital assistant (PDA), a handheld device with wireless communication capabilities, a computing device or other processing devices connected to a wireless modem, a vehicle-mounted device, a wearable device, a terminal device in the future 5G network, a terminal device in the future evolved PLMN network, etc.

Uplink and downlink transmissions may be performed between the network device 110 and the terminal device 120, where the wireless communication system 100 may support at least two waveforms for an uplink transmission, for example, the waveforms supported by the wireless communication system 100 may include orthogonal frequency division multiplexing (OFDM) or discrete Fourier transform spreading OFDM (DFT-s-OFDM), or other waveforms, which is not limited in the embodiments of the present disclosure. When a certain uplink transmission is specifically performed, the network device 110 may determine a waveform used in the current uplink transmission from the at least two supported optional uplink waveforms.

FIG. 1 exemplarily shows one network device and two terminal devices. In an embodiment, the wireless communication system 100 may include a plurality of network devices, each of which may include other number of terminal devices within its coverage, but embodiments of the present disclosure are not limited thereto.

In an embodiment, the wireless communication system 100 may further include other network entities, such as a network controller, a mobility management entity and the like, but embodiments of the present disclosure are not limited thereto.

It should be understood that the terms "system" and "network" are used interchangeably herein. The term such as "and/or" herein is merely an association relationship describing associated objects, which indicates that there may be three relationships, for example, A and/or B may indicate presence of A only, of both A and B, and of B only. In addition, the character "/" herein generally indicates that contextual objects have an "or" relationship.

Figure 2:
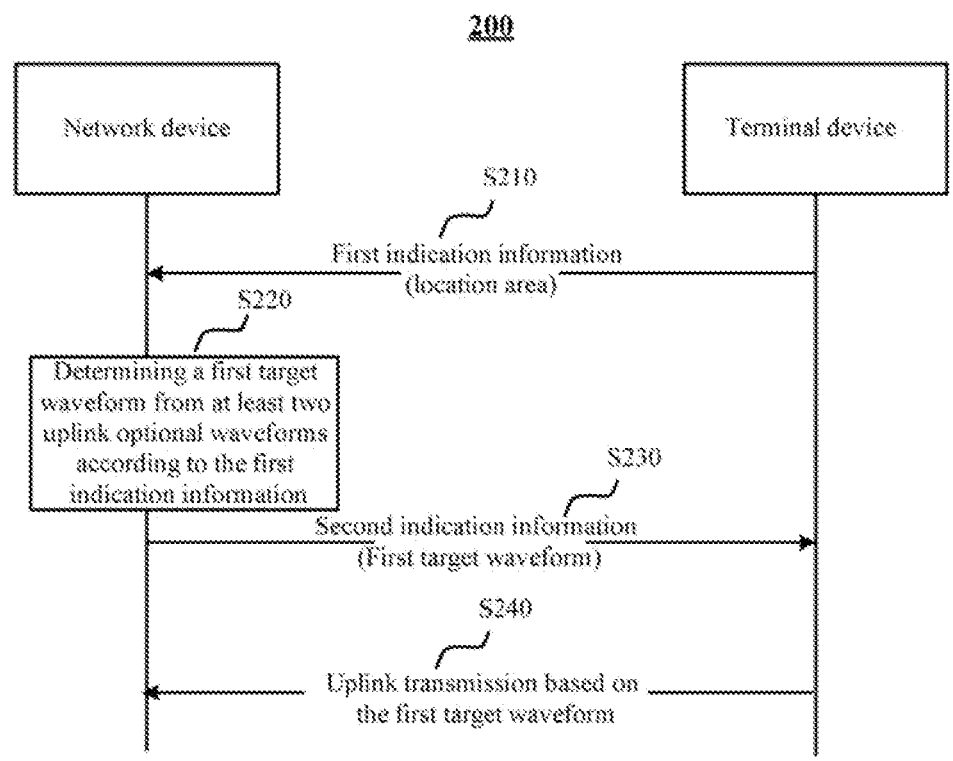
FIG. 2 is a schematic flowchart of a communication method provided by an embodiment of the present disclosure.

FIG. 2 is a schematic flowchart of a communication method 200 according to an embodiment of the present disclosure. The method 200 can be applied to the wireless communication system 100 as shown in FIG. 1.

At S210, a terminal device transmits first indication information to a network device, where the first indication information is used to indicate a location area in which the terminal device is currently located.

In an embodiment of the present disclosure, the location area in which the terminal device is currently located may refer to a location area in which the terminal device is currently located in a cell managed by the network device. In an embodiment, in consideration of a great influence on efficiency of transmit power from a waveform used in an uplink transmission, the location area in the embodiment of the present disclosure may be related to the transmit power used by the terminal device, but the embodiment of the present disclosure is not limited thereto.

As an optional embodiment, the coverage of the network device may be divided into the following three location areas: a cell center area, a cell edge area, and other areas except the cell center area and the cell edge area, where the other areas may be located between the cell center area and the cell edge area. At this time, in an embodiment, the location area in which the terminal device is currently located may be specifically: a cell center area, a cell edge area, or an area between the cell center area and the cell edge area.

At this time, in an embodiment, two bits may be used in the first indication information to indicate the location area in which the terminal device is currently located. As an example, 00 indicates that the terminal device is currently in the cell center area, 11 indicates that the terminal device is currently in the cell edge area, 01 indicates that the terminal device is currently between the cell center area and the cell edge area, and 10 may be used as a reserved state, but a corresponding relationship between the bits and the location area is not limited in the embodiment of the present disclosure. In an embodiment, other numbers of bits may be used to indicate the location area in which the terminal device is currently located, which is not limited in the embodiment of the present disclosure.

As another optional embodiment, the coverage of the network device may be divided into two location areas, such as a cell edge area and other areas except the cell edge area, or a cell center area and other areas except the cell center area. Alternatively, the coverage of the network device may be divided into other number of location areas, which is not limited in the embodiment of the present disclosure.

In an embodiment of the present disclosure, the terminal device may determine a location area in which the terminal device is currently located, and report its current location area to the network device. Specifically, the terminal device may determine the location area in which the terminal device is currently located in various ways. For example, the terminal device may measure a downlink reference signal transmitted by the network device, and determine, according to a result of a measurement, the location area in which the terminal device is currently located. As an example, the result of the measurement may include at least one of path loss, reference signal received power (RSRP), and reference signal received quality (RSRQ), or the result of the measurement may also include other parameters, but the embodiment of the present disclosure is not limited thereto.

An example is taken where the result of the measurement includes the path loss, the terminal device may determine, according to a path loss obtained from the measurement, the location area in which the terminal device is currently located. In an embodiment, if the path loss meets a first threshold condition, for example, the path loss is lower than a first threshold value, the terminal device may then determine that it is currently located in the cell center area; if the path loss meets a second threshold condition, for example, the path loss is higher than a second threshold value, where the second threshold is greater than the first threshold, the terminal device may then determine that it is currently located in the cell edge area; if the path loss is between the first threshold value and the second threshold value, the terminal device may then determine that it is currently located between the cell center area and the cell edge area. In an embodiment, the first threshold condition and the second threshold condition may be defined in a protocol, or indicated by the network device through transmitting third indication information to the terminal device, where the third indication information may be carried in a UE-specific signaling or in a broadcast message, which is not limited in the embodiment of the present disclosure.

In an embodiment of the present disclosure, after the terminal device determines a location area in which the terminal device is currently located, the terminal device may always report its current location area to the network device; alternatively, the terminal device may report its current location area to the network device only in a specific case. For example, the terminal device may report its current location area to the network device only when it is determined that the terminal device is currently in the cell center area; for another example, the terminal device may store information about the location area previously reported to the network device, and report its current location area to the network device only when the determined current location area is different from the previously reported location area. In an embodiment, a triggering condition used for the terminal device to report, to the network device, the location area in which the terminal device is currently located may be defined in the protocol, or may be pre-configured by the network device, for example, configured in a broadcast message, which is not limited in the embodiment of the present disclosure.

In an embodiment of the present disclosure, the terminal device may actively transmit the first indication information to the network device. For example, the terminal device may transmit the first indication information to the network device when there is uplink data to be transmitted, or when the network device is initially accessed. Alternatively, the terminal device may periodically report, location area in which the terminal device is currently located, to the network device, which is not limited in the embodiment of the present disclosure. In an embodiment, the terminal device may transmit the first indication information to the network device when an indication from the network device is received, but the embodiment of the present disclosure is not limited thereto.

As an optional embodiment, the terminal device may transmit the first indication information to the network device during a random access to the network device. For example, the terminal device may carry the first indication information in a random access request transmitted to the network device.

As an example, the terminal device may report the location area in which the terminal device is currently located by the means of attaching an information bit after the preamble in the random access request. At this time, the random access request may carry the preamble and the first indication information, where a bit occupied by the first indication information may follow immediately after the preamble. In an embodiment, the first indication information may also be located at other locations of the preamble, but a positional relationship between the preamble and the first indication information is not limited in the embodiment of the present disclosure.

As another example, the terminal device may indicate the location area in which the terminal device is currently located by carrying a different preamble in the random access request, accordingly, the random access request carrying the first indication information may be specifically: the random access request carries a preamble corresponding to the location area in which the terminal device is currently located. A corresponding relationship between the preamble or a preamble set and the location area may be defined in the protocol, or may be pre-configured by the network device, which is not limited in the embodiment of the present disclosure. At this time, the terminal device may determine, from a plurality of optional preambles, a preamble corresponding to the location area in which the terminal device is currently located, and transmit the preamble to the network device, accordingly, the network device may determine, according to the received preamble and the corresponding relationship between the preamble or the preamble set and the location area, the location area in which the terminal device is currently located, but the embodiment of the present disclosure is not limited thereto.

As another optional embodiment, the terminal device may report its current location area to the network device during a process for requesting an uplink scheduling. For example, the terminal device may transmit a scheduling request to the network device, where the scheduling request carries the first indication information. As an optional example, the scheduling request that currently only has one bit may be extended, for example, the scheduling request is extended to more than two bits, where some or all bits in the scheduling request may be used to carry the first indication information, but the embodiment of the disclosure is not limited thereto.

At S220, the network device determines a first target waveform from at least two optional uplink waveforms according to the location area in which the terminal device is currently located.

As an optional embodiment, the at least two optional uplink waveforms may include OFDM and DFT-s-OFDM, or may include other types of waveforms, which is not limited in the embodiment of the present disclosure.

As an example, if the terminal device is currently located in the cell center area, then the network device may determine OFDM as the first target waveform. In an embodiment, if the terminal device is currently located in the cell edge region, the network device may determine DFT-s-OFDM as the first target waveform. In an embodiment, if the location area in which the terminal device is currently located is between the cell edge area and the cell center area, then the network device may determine OFDM or DFT-s-OFDM as the first target waveform, or may determine the first target waveform from the at least two optional uplink waveforms in combination with other information of the terminal device, for example, the first target waveform may be determined in combination with a result of a measurement for an uplink reference signal transmitted by the terminal device, but the embodiment of the present disclosure is not limited thereto.

At S230, the network device transmits second indication information to the terminal device, where the second indication information is used to indicate the first target waveform.

In an embodiment, if a random access request carrying the first indication information is received by the network device, then at S230, the network device may transmit a random access response to the terminal device, where the random access response carries the second indication information, but the embodiment of the present disclosure is not limited thereto.

In an embodiment, if a scheduling request carrying the first indication information is received by the network device, then at S230, the network device may transmit an uplink grant (UL grant) to the terminal device, where the uplink grant carries the second indication information, but the embodiment of the present disclosure is not limited thereto.

As another optional embodiment, if the first indication information is used to indicate that the location area in which the terminal device is currently located is between the cell center area and the cell edge area, then the second indication information may also be used to instruct the terminal device to transmit an uplink reference signal to the network device, but the embodiment of the present disclosure is not limited thereto.

At S240, the terminal device performs the uplink transmission using the first target waveform.

In an embodiment, if the second indication information is further used to instruct the terminal device to transmit an uplink reference signal, then at S240, the terminal device may use the first target waveform to transmit the uplink reference signal to the network device, such as a sounding reference signal (SRS). Correspondingly, the network device may measure the uplink reference signal transmitted by the terminal device, and determine a second target waveform from the at least two optional uplink waveforms according to a result of a measurement, where the second target waveform and the first target waveform may be the same or different.

As an optional example, the result of the measurement obtained by the network device may include path loss, and the network device may determine the second target waveform in the following manners: if the path loss is lower than a preset threshold value, then the network device may determine OFDM as the second target waveform: otherwise, the network device may determine DFT-s-OFDM as the second target waveform. In an embodiment, the result of the measurement obtained by the network device may also include other parameters. A manner in which the network device determines the second target waveform according to the result of the measurement is not limited in the embodiment of the present disclosure.

In an embodiment, after the network device determines the second target waveform, it may transmit fourth indication information to the terminal device, where the fourth indication information may be used to indicate the second target waveform. Correspondingly, the terminal device may receive the fourth indication information transmitted by the network device, and perform the uplink transmission using the second target waveform.

In an embodiment of the present disclosure, the network device may transmit the fourth indication information to the terminal device regardless of whether the second target waveform and the first target waveform are the same. At this time, the terminal device may determine the second target waveform according to the received fourth indication information.

As another optional embodiment, the network device may also transmit the fourth indication information to the terminal device only when the second target waveform and the first target waveform are different. At this time, the terminal device may perform the uplink transmission using the second target waveform indicated in the fourth indication information when the fourth indication information is received, and still perform the uplink transmission using the first target waveform when the fourth indication information is not received. At this time, in an embodiment, a timer may be started when the terminal device receives the second indication information or transmits the uplink reference signal to the network device, if the fourth indication information is not received when the timer expires, the uplink transmission is performed using the first target waveform, where the timer may be regulated by protocol, or configured by the network device, for example, indicated by the network device in the second indication information, but the embodiment of the present disclosure is not limited thereto.

In the prior art, when the network device determines the waveform used in the uplink transmission, it needs to measure the uplink reference signal transmitted by the terminal device. However, when the terminal device initially accesses the network device or asks for an uplink scheduling (scheduling request) from the network device, the network device cannot measure the uplink reference signal and cannot determine the waveform used in the uplink transmission. Through reporting, by a terminal device, a location area in which the terminal device is currently located to a network device, and determining, by the network device, a first target waveform of the terminal device front at least two optional uplink waveforms according to the location area in which the terminal device is currently located, a communication method provided by an embodiment of the present disclosure can be applied to determine a waveform used in an uplink transmission in various scenarios, in particular, when the terminal device is not in the RRC connected mode, it is still possible to determine the waveform used in the uplink transmission of the terminal device, for example, the terminal device initially accesses the network device or the terminal device requests an uplink scheduling, and thus system performance is improved.

It should be understood that the size of the sequence numbers of the above processes do not imply an execution order. The execution order of the processes should be determined by their functions and internal logic, but is not intended to limit an implementation in the embodiments of the present disclosure.

Figure 3:
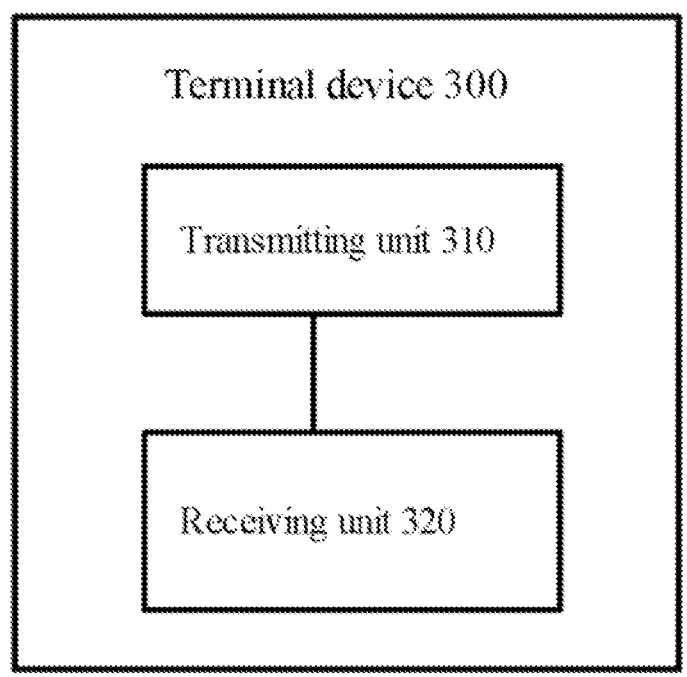
FIG. 3 is a schematic block diagram of a terminal device provided by an embodiment of the present disclosure.

FIG. 3 schematically shows a terminal device 300 provided by an embodiment of the present disclosure. The terminal device 300 includes:
  a transmitting unit 310, configured to transmit first indication information to a network device, where the first indication information is used to indicate a location area in which the terminal device 300 is currently located; and
  a receiving unit 320, configured to receive second indication information transmitted by the network device, where the second indication information is used to indicate a first target waveform, the first target waveform being determined by the network device from at least two optional uplink waveforms according to the first indication information transmitted by the transmitting unit 310.

The transmitting unit 310 is further configured to perform an uplink transmission using the first target waveform indicated in the second indication information received by the receiving unit 320.

In an embodiment, the location area in which the terminal device 300 is currently located includes: a cell center area, a cell edge area, or an area between the cell center area and the cell edge area.

In an embodiment, the transmitting unit 310 is specifically configured to transmit a random access request to the network device, where the random access request carries the first indication information.

At this time, in an embodiment, the receiving unit 320 is specifically configured to receive a random access response transmitted by the network device, where the random access response carries the second indication information.

In an embodiment, the random access request further carries a preamble, where a bit occupied by the first indication information follows immediately after the preamble.

In an embodiment, the terminal device 300 further includes: a first determining unit, configured to: before the transmitting unit 310 transmits the first indication information to the network device, determine a preamble corresponding to the location area in which the terminal device 300 is currently located from at least two preambles according to a corresponding relationship between the location area and the preamble.

At this time, the random access request carrying the first indication information may include: the random access request carries a preamble determined by the determining unit.

In an embodiment, the transmitting unit 310 is specifically configured to transmit a scheduling request to the network device, where the scheduling request carries the first indication information.

At this time, in an embodiment, the receiving unit 320 is specifically configured to receive an uplink grant transmitted by the network device, where the uplink grant carries the second indication information.

In an embodiment, the terminal device 300 further includes:
  a measuring unit, configured to: before the transmitting unit 310 transmits the first indication information to the network device, measure a downlink reference signal transmitted by the network device; and
  a second determining unit, configured to determine, according to a result of a measurement obtained by the measuring unit, the location area in which the terminal device 300 is currently located.

In an embodiment, the second determining unit is specifically configured to determine the location area in which the terminal device 300 is currently located by comparing the result of the measurement obtained by the measuring unit with at least two threshold conditions.

In an embodiment, the receiving unit 320 is further configured to: before the second determining unit determines, according to the result of the measurement obtained by the measuring unit, the location area in which the terminal device 300 is currently located, receive third indication information transmitted by the network device, where the third indication information is used to indicate the at least two threshold conditions.

In an embodiment, the receiving unit 320 is specifically configured to receive a broadcast message transmitted by the network device, where the broadcast message carries the third indication information.

In an embodiment, if the first indication information indicates that the terminal device 300 is currently located between the cell edge area and the cell center area, the second indication information is further used to instruct the terminal device 300 to transmit an uplink reference signal to the network device.

Correspondingly, the transmitting unit 310 is specifically configured to transmit the uplink reference signal to the network device using the first target waveform according to the second indication information.

In an embodiment, the receiving unit 320 is further configured to: receive fourth indication information transmitted by the network device, where the fourth indication information is used to indicate a second target waveform determined by the network device from the at least two optional uplink waveforms according to the uplink reference signal.

Correspondingly, the transmitting unit 310 is further configured to perform the uplink transmission using the second target waveform indicated in the fourth indication information received by the receiving unit 320.

In an embodiment, the first indication information occupies at least two bits.

In an embodiment, the at least two optional uplink waveforms include: OFDM and DFT-s-OFDM.

It should be understood that the terminal device 300 herein is embodied in a form of functional unit. The term "unit" herein may refer to an application specific integrated circuit (ASIC), an electronic circuit, a processor (such as a shared processor, a dedicated processor, a group processor or the like) and a memory for executing one or more software or firmware programs, a merged logic circuit, and/or other suitable components that support the functions described. In an optional example, those skilled in the art will appreciate that the terminal device 300 may be specifically the terminal device in the foregoing method embodiments, and the terminal device 300 may be configured to perform various processes and/or steps corresponding to the terminal device in the foregoing method embodiments. To avoid a redundancy, details will not be described here again.

Figure 4:
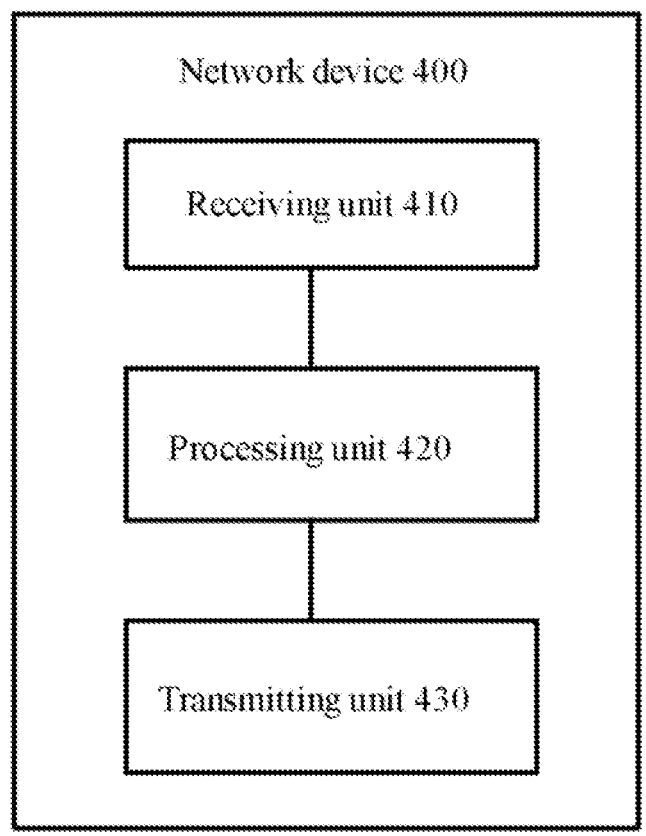
FIG. 4 is a schematic block diagram of a network device provided by an embodiment of the present disclosure.

FIG. 4 schematically shows a network device 400 provided by an embodiment of the present disclosure. The network device 400 includes:
- a receiving unit 410, configured to receive first indication information transmitted by a terminal device, where the first indication information is used to indicate a location area in which the terminal device is currently located;
- a processing unit 420, configured to determine a first target waveform from at least two optional uplink waveforms according to the location area indicated in the first indication information received by the receiving unit 410; and
- a transmitting unit 430, configured to transmit second indication information to the terminal device, where the second indication information is used to instruct the terminal device to perform an uplink transmission using the first target waveform determined by the processing unit 420.

In an embodiment, the location area in which the terminal device is currently located includes: a cell center area, a cell edge area, or an area between the cell center area and the cell edge area.

In an embodiment, the receiving unit 410 is specifically configured to receive a random access request transmitted by the terminal device, where the random access request carries the first indication information.

At this time, in an embodiment, the transmitting unit 430 may be specifically configured to transmit a random access response to the terminal device, where the random access response carries the second indication information.

In an embodiment, the random access request further carries a preamble, and where a bit occupied by the first indication information follows immediately after the preamble.

In an embodiment, the random access request carrying the first indication information includes: the random access request carries a preamble corresponding to the location area in which the terminal device is currently located.

In an embodiment, the receiving unit 410 is specifically configured to receive a scheduling request transmitted by the terminal device, where the scheduling request carries the first indication information.

At this time, in an embodiment, the transmitting unit 430 may be specifically configured to transmit an uplink grant to the terminal device, where the uplink grant carries the second indication information.

In an embodiment, the transmitting unit 430 is further configured to: before the receiving unit 410 receives the first indication information transmitted by the terminal device, transmit a downlink reference signal to the terminal device, where the downlink reference signal is used for the terminal device to determine the location area in which the terminal device is currently located.

In an embodiment, the transmitting unit 430 is further configured to: before the receiving unit 410 receives the first indication information transmitted by the terminal device, transmit third indication information to the terminal device, where the third indication information is used to indicate at least two threshold conditions, the at least two threshold conditions being used for the terminal device to determine, according to a result of a measurement for the downlink reference signal, the location area in which the terminal device is currently located.

In an embodiment, the transmitting unit 430 is specifically configured to transmit a broadcast message to the terminal device, where the broadcast message carries the third indication information.

In an embodiment, the processing unit 420 is specifically configured to: if the first indication information indicates that the terminal device is currently located between the cell edge area and the cell center area, determine DFT-s-OFDM of the at least two optional uplink waveforms as the first target waveform.

In an embodiment, if the first indication information indicates that the terminal device is currently located between the cell edge area and the cell center area, the second indication information is further used to instruct the terminal device to transmit an uplink reference signal to the network device.

At this time, in an embodiment, the receiving unit 410 is further configured to receive the uplink reference signal transmitted by the terminal device using the first target waveform.

Correspondingly, the processing unit 420 is further configured to determine a second target waveform from the at least two optional uplink waveforms according to the uplink reference signal received by the receiving unit 410.

Specifically, the processing unit 420 may measure the received uplink reference signal, and determine a second target waveform from the at least two optional uplink waveforms according to a result of a measurement.

As an optional example, the result of the measurement may include path loss. At this time, in an embodiment, the processing unit 420 is specifically configured to:
 if the path loss is lower than a preset threshold value, determine OFDM of the at least two optional uplink waveforms as the second target waveform;
 otherwise, determine DFT-s-OFDM of the at least two optional uplink waveforms as the second target waveform.

In an embodiment, the transmitting unit 430 is further configured to transmit fourth indication information to the terminal device, where the fourth indication information is used to instruct the terminal device to perform an uplink transmission using the second target waveform.

In an embodiment, the first indication information occupies at least two bits.

In an embodiment, the at least two optional uplink waveforms include: OFDM and DFT-s-OFDM.

It should be understood that the network device 400 herein is embodied in a form of functional unit. The term "unit" herein may refer to an application specific integrated circuit (ASIC), an electronic circuit, a processor (such as a shared processor, a dedicated processor, a group processor or the like) and a memory for executing one or more software or firmware programs, a merged logic circuit, and/or other suitable components that support the functions described. In an optional example, those skilled in the art will appreciate that the network device 400 may be specifically the network device in the foregoing method embodiments, and the network device 400 may be configured to perform various processes and/or steps corresponding to the network device in the foregoing method embodiments. To avoid a redundancy, details will not be described here again.

Figure 5:
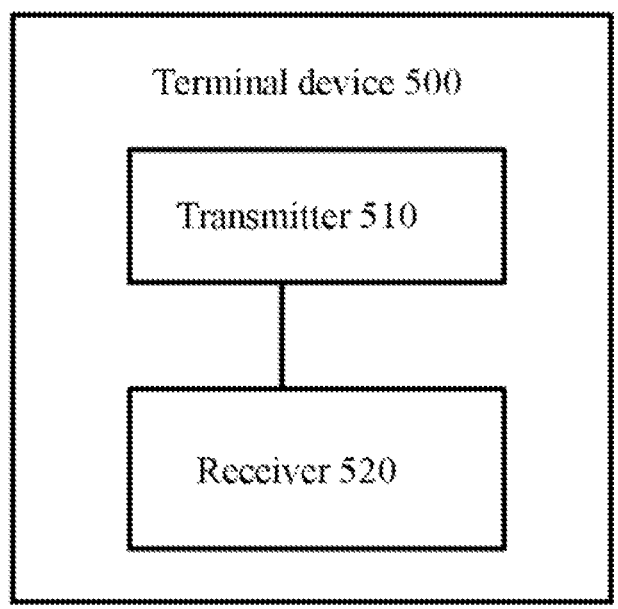
FIG. 5 is a schematic block diagram of another terminal device provided by an embodiment of the present disclosure.

FIG. 5 schematically shows a terminal device 500 provided by an embodiment of the present disclosure. The terminal device 500 includes:

a transmitter 510, configured to transmit first indication information to a network device, where the first indication information is used to indicate a location area in which the terminal device 500 is currently located; and a receiver 520, configured to receive second indication information transmitted by the network device, where the second indication information is used to indicate a first target waveform, the first target waveform being determined by the network device from at least two optional uplink waveforms according to the first indication information transmitted by the transmitter 510.

The transmitter 510 is further configured to perform an uplink transmission using the first target waveform indicated in the second indication information received by the receiver 520.

In an embodiment, the location area in which the terminal device 500 is currently located includes: a cell center area, a cell edge area, or an area between the cell center area and the cell edge area.

In an embodiment, the transmitter 510 is specifically configured to transmit a random access request to the network device, where the random access request carries the first indication information.

At this time, in an embodiment, the receiver 520 is specifically configured to receive a random access response transmitted by the network device, where the random access response carries the second indication information.

In an embodiment, the random access request further carries a preamble, and where a bit occupied by the first indication information follows immediately after the preamble.

In an embodiment, the terminal device 500 further includes: a processor, configured to: before the transmitter 510 transmits the first indication information to the network device, determine a preamble corresponding to the location area in which the terminal device 500 is currently located from at least two preambles according to a corresponding relationship between the location area and the preamble.

At this time, the random access request carrying the first indication information may include: the random access request carries a preamble determined by the processor.

In an embodiment, the transmitter 510 is specifically configured to transmit a scheduling request to the network device, where the scheduling request carries the first indication information.

At this time, in an embodiment, the receiver 520 is specifically configured to receive an uplink grant transmitted by the network device, where the uplink grant carries the second indication information.

In an embodiment, the terminal device 500 further includes: a processor, configured to: before the transmitter 510 transmits the first indication information to the network device, measure a downlink reference signal transmitted by the network device; and determine, according to a result of a measurement, the location area in which the terminal device 500 is currently located.

In an embodiment, the processor is specifically configured to determine the location area in which the terminal device 500 is currently located by comparing the result of the measurement with at least two threshold conditions.

In an embodiment, the receiver 520 is further configured to: before the location area in which the terminal device 500 is currently located is determined according to the result of the measurement, receive third indication information transmitted by the network device, where the third indication information is used to indicate the at least two threshold conditions.

In an embodiment, the receiver 520 is specifically configured to receive a broadcast message transmitted by the network device, where the broadcast message carries the third indication information.

In an embodiment, if the first indication information indicates that the terminal device 500 is currently located between the cell edge area and the cell center area, the second indication information is further used to instruct that the terminal device 500 to transmit an uplink reference signal to the network device.

Correspondingly, the transmitter 510 is specifically configure to transmit the uplink reference signal to the network device using the first target waveform according to the second indication information.

In an embodiment, the receiver 520 is further configured to: receive fourth indication information transmitted by the network device, where the fourth indication information is used to indicate a second target waveform determined by the network device from the at least two optional uplink waveforms according to the uplink reference signal.

Correspondingly, the transmitter 10 is further configured to perform the uplink transmission using the second target waveform indicated in the fourth indication information received by the receiver 520.

In an embodiment, the first indication information occupies at least two bits.

In an embodiment, the at least two optional uplink waveforms include: OFDM and DFT-s-OFDM.

It should be understood that the terminal device 500 herein may be specifically the terminal device in the foregoing embodiments, and may be configured to perform various steps and/or processes corresponding to the terminal device in the foregoing method embodiments.

In an embodiment, the terminal device 500 may further include a memory, which may include a read only memory and a random access memory, and provides instructions and data to the processor. A portion of the memory may also include a non-volatile random access memory. For example, the memory may also store information about device type. The processor may be configured to execute the instructions stored in the memory, and when the processor executes the instructions, the processor may perform various steps corresponding to the terminal device in the foregoing method embodiments.

Figure 6:
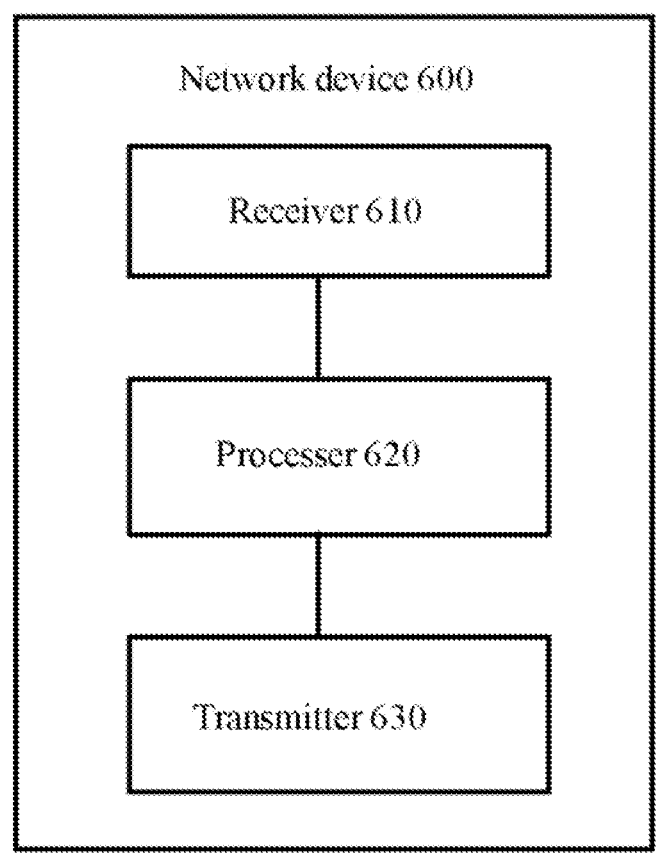
FIG. 6 is a schematic block diagram of another network device provided by an embodiment of the present disclosure.

FIG. 6 schematically shows a network device 600 provided by an embodiment of the present disclosure. The network device 600 includes:

- a receiver 610, configured to receive first indication information transmitted by a terminal device, where the first indication information is used to indicate a location area in which the terminal device is currently located;
- a processor 620, configured to determine a first target waveform from at least two optional uplink waveforms according to the location area indicated in the first indication information received by the receiver 610; and
- a transmitter 630, configured to transmit second indication information to the terminal device, where the second indication information is used to instruct the terminal device to perform an uplink transmission using the first target waveform determined by the processor 620.

In an embodiment, the location area in which the terminal device is currently located includes: a cell center area, a cell edge area, or an area between the cell center area and the cell edge area.

In an embodiment, the receiver 610 is specifically configured to receive a random access request transmitted by the terminal device, where the random access request carries the first indication information.

At this time, in an embodiment, the transmitter 630 may be specifically configured to transmit a random access response to the terminal device, where the random access response carries the second indication information.

In an embodiment, the random access request further carries a preamble, where a bit occupied by the first indication information follows immediately after the preamble.

In an embodiment, the random access request carrying the first indication information includes: the random access request carries a preamble corresponding to the location area in which the terminal device is currently located.

In an embodiment, the receiver 610 is specifically configured to receive a scheduling request transmitted by the terminal device, where the scheduling request carries the first indication information.

At this time, in an embodiment, the transmitter 630 may be specifically configured to transmit an uplink grant to the terminal device, where the uplink grant carries the second indication information.

In an embodiment, the transmitter 630 is further configured to: before the receiver 610 receives the first indication information transmitted by the terminal device, transmit a downlink reference signal to the terminal device, where the downlink reference signal is used for the terminal device to determine the location area in which the terminal device is currently located.

In an embodiment, the transmitter 630 is further configured to: before the receiver 610 receives the first indication information transmitted by the terminal device, transmit third indication information to the terminal device, where the third indication information is used to indicate at least two threshold conditions, the at least two threshold conditions being used for the terminal device to determine, according to a result of a measurement for the downlink reference signal, the location area in which the terminal device is currently located.

In an embodiment, the transmitter 630 is specifically configured to transmit a broadcast message to the terminal device, where the broadcast message carries the third indication information.

In an embodiment, the processor 620 is specifically configured to: if the first indication information indicates that the terminal device is currently located between the cell edge area and the cell center area, determine DFT-s-OFDM of the at least two optional uplink waveforms as the first target waveform.

In an embodiment, if the first indication information indicates that the terminal device is currently located between the cell edge area and the cell center area, the second indication information is further used to instruct the terminal device to transmit an uplink reference signal to the network device.

At this time, in an embodiment, the receiver 610 is further configured to receive the uplink reference signal transmitted by the terminal device using the first target waveform.

Correspondingly, the processor 620 is further configured to determine a second target waveform from the at least two optional uplink waveforms according to the uplink reference signal received by the receiver 610.

Specifically, the processor 620 may measure the received uplink reference signal, and determine a second target waveform from the at least two optional uplink waveforms according to a result of a measurement.

As an optional example, the result of the measurement may include path loss. At this time, in an embodiment, the processor 620 is specifically configured to: if the path loss is lower than a preset threshold value, determine OFDM of the at least two optional uplink waveforms as the second target waveform; otherwise, determine DFT-s-OFDM of the at least two optional uplink waveforms as the second target waveform.

In an embodiment, the transmitter 630 is further configured to transmit fourth indication information to the terminal device, where the fourth indication information is used to instruct the terminal device to perform an uplink transmission using the second target waveform.

In an embodiment, the first indication information occupies at least two bits.

In an embodiment, the at least two optional uplink waveforms include: OFDM and DFT-s-OFDM.

It should be understood that the network device 600 herein may be specifically the network device in the foregoing embodiments, and may be configured to perform various steps and/or processes corresponding to the network device in the foregoing method embodiments.

In an embodiment, the network device 600 may further include a memory, which may include a read only memory and a random access memory, and provides instructions and data to the processor. A portion of the memory may also include a non-volatile random access memory. For example, the memory may also store information about device type. The processor may be configured to execute the instructions stored in the memory, and when the processor executes the instructions, the processor may perform various steps corresponding to the network device in the foregoing method embodiments.

It may be known to persons skilled in the art that, each of the units and the method steps that are described in combination with the embodiments disclosed herein may be implemented by electronic hardware, computer software or a combination thereof. To clearly illustrate interchangeability between hardware and software, the steps and the components of the embodiments have been described generally in the foregoing description in terms of their functionality. The situation whether these functions are performed by hardware or software depends on specific applications and design constraints of the technical solution. Persons skilled in the art may implement the described functions by using different methods for each specific application, and such implementation should not be regarded as going beyond the scope of the present application.

It may be clearly understood by persons skilled in the art that, for the purpose of convenient and brief description, reference may be made to the corresponding process in the foregoing method embodiments for detailed working processes of the foregoing systems, apparatuses, and units, and details will not be described herein again.

In several embodiments provided in the present application, it should be understood that the disclosed systems, apparatuses, and methods may be implemented in other manners. For example, the described apparatus embodiments are merely exemplary. For instance, the division of the units is merely a division of logical functions and there may be other divisions during actual implementations. For instance, multiple units or components may be combined or integrated into another system, or some features may be omitted or not performed. In addition, the displayed or discussed mutual couplings or direct couplings or communication connections may be indirect couplings or communication connections through some interfaces, apparatus or units, or connections through electronic, mechanical, or other forms.

The units described as separate parts may or may not be physically separate, and parts displayed as units may or may not be physical units, that is, may be located in one position, or may be distributed on multiple network units. A part or all of the units may be selected according to actual needs to achieve the objectives of the scheme in the embodiments of the present disclosure.

In addition, each of functional units in each of the embodiments of the present disclosure may be integrated into one processing unit, or each of the units may exist alone physically, or two or more units are integrated into one unit. The above integrated unit may be implemented in a form of hardware or in a form of software functional unit.

If the integrated unit is implemented in the form of software functional unit and sold or used as an independent product, it may be stored in a computer-readable storage medium. Based on such an understanding, the technical solution of the present application essentially, or the part contributing to the prior art, or some of all of the technical solution may be implemented in a form of software product. The computer software product is stored in a storage medium, and includes several instructions for enabling a computer device (which may be a personal computer, a server, or a network device, etc.) to perform all or a part of the steps of the methods described in each of the embodiments of the present disclosure. The foregoing storage medium includes: any mediums that can store program codes, such as a USB flash disk, a mobile hard disk, a read-only memory (ROM), a random access memory (RAM), a magnetic disk, or an optical disc, etc.

The above descriptions are merely specific embodiments of the present disclosure; however, the protection scope of the present application is not limited thereto. Any person skilled in the art may readily envisage of various equivalent modifications or replacements within the technical scope disclosed herein. These modifications or replacements should fall into the protection scope of the present application. Thus, the protection scope of the present application shall be subject to the claims.

What is claimed is:

1. A communication method, comprising:
   transmitting, by a terminal device, first indication information to a network device, wherein the first indication information is used to indicate a location area in which the terminal device is currently located;
   receiving, by the terminal device, second indication information transmitted by the network device, wherein the second indication information is used to indicate a first target waveform, the first target waveform being determined by the network device from at least two optional uplink waveforms according to the location area in which the terminal device is currently located; and
   performing, by the terminal device, an uplink transmission using the first target waveform;
   wherein the transmitting, by a terminal device, first indication information to a network device comprises:
   transmitting, by the terminal device, a random access request to the network device, wherein the random access request carries the first indication information;
   wherein before the transmitting, by a terminal device, first indication information to a network device, further comprising:
   determining, by the terminal device, a preamble corresponding to the location area in which the terminal device is currently located from at least two preambles according to a corresponding relationship between the location area and the preamble;
   the random access request carrying the first indication information comprises: the random access request carries the preamble corresponding to the location area in which the terminal device is currently located.

2. The method according to claim 1, wherein the location area in which the terminal device is currently located comprises: a cell center area, a cell edge area, or an area between a cell center area and a cell edge area.

3. The method according to claim 1, wherein the random access request further carries a preamble, and wherein a bit occupied by the first indication information follows immediately after the preamble.

4. The method according to claim 1, before the transmitting, by a terminal device, first indication information to a network device, further comprising:
   measuring, by the terminal device, a downlink reference signal transmitted by the network device; and
   determining, by the terminal device, the location area in which the terminal device is currently located according to a result of the measurement.

5. The method according to claim 4, wherein the determining, by the terminal device, the location area in which the terminal device is currently located according to a result of the measurement comprises:
   determining, by the terminal device, the location area in which the terminal device is currently located by comparing a result of the measurement with the at least two threshold conditions.

6. The method according to claim 5, before the determining, by the terminal device, the location area in which the terminal device is currently located according to a result of the measurement, further comprising:
   receiving, by the terminal device, third indication information transmitted by the network device, wherein the third indication information is used to indicate the at least two threshold conditions.

7. The method according to claim 6, wherein the receiving, by the terminal device, third indication information transmitted by the network device comprises:
receiving, by the terminal device, a broadcast message transmitted by the network device, wherein the broadcast message carries the third indication information.

8. The method according to claim 1, wherein if the first indication information indicates that the terminal device is currently located between the cell edge area and the cell center area, the second indication information is further used to instruct the terminal device to transmit an uplink reference signal to the network device;
the performing, by the terminal device, an uplink transmission using the first target waveform comprises:
transmitting, by the terminal device, the uplink reference signal to the network device using the first target waveform according to the second indication information.

9. The method according to claim 8, further comprising:
receiving, by the terminal device, fourth indication information transmitted by the network device, wherein the fourth indication information is used to indicate a second target waveform determined by the network device from the at least two optional uplink waveforms according to the uplink reference signal; and
performing, by the terminal device, an uplink transmission using the second target waveform.

10. The method according to claim 1, wherein the first indication information occupies at least two bits, and wherein the at least two optional uplink waveforms comprise: orthogonal frequency division multiplexing (OFDM) and discrete Fourier transform spreading orthogonal frequency division multiplexing (DFT-s-ODM).

11. A terminal device, comprising a transmitter, a receiver, a processor and a memory storing instructions thereon, the processor when executing the instructions, being configured to:
control the transmitter to transmit first indication information to a network device, wherein the first indication information is used to indicate a location area in which the terminal device is currently located;
control the receiver to receive second indication information transmitted by the network device, wherein the second indication information is used to indicate a first target waveform, the first target waveform being determined by the network device from at least two optional uplink waveforms according to the first indication information; and
perform an uplink transmission using the first target waveform indicated in the second indication information;
wherein the processor is further configured to control the transmitter to transmit a random access request to the network device, wherein the random access request carries the first indication information;
wherein the processor is further configured to:
before the processor transmits first indication information to a network device, determine a preamble corresponding to the location area in which the terminal device is currently located from at least two preambles according to a corresponding relationship between the location area and the preamble;
the random access request carrying the first indication information comprises: the random access request carries the preamble.

12. The terminal device according to claim 11, wherein the location area in which the terminal device is currently located comprises: a cell center area, a cell edge area, or an area between a cell center area and a cell edge area.

13. The terminal device according to claim 11, wherein the random access request further carries a preamble, and wherein a bit occupied by the first indication information follows immediately after the preamble.

14. The terminal device according to claim 11, wherein the processor is further configured to:
before the processor transmits first indication information to a network device, measure a downlink reference signal transmitted by the network device; and
determine the location area in which the terminal device is currently located according to a result of the measurement.

15. The terminal device according to claim 14, wherein the processor is further configured to determine the location area in which the terminal device is currently located by comparing a result of the measurement with the at least two threshold conditions.

16. The terminal device according to claim 15, the processor is further configured to control the receiver to: before the processor determines the location area in which the terminal device is currently located according to a result of a measurement, receive third indication information transmitted by the network device, wherein the third indication information is used to indicate the at least two threshold conditions.

17. The terminal device according to claim 16, wherein the processor is further configured to control the receiver to receive a broadcast message transmitted by the network device, wherein the broadcast message carries the third indication information.

18. The terminal device according to claim 11, wherein if the first indication information indicates that the terminal device is currently located between the cell edge area and the cell center area, the second indication information is further used to instruct the terminal device to transmit an uplink reference signal to the network device; and
wherein the processor is further configured to control the transmitter to transmit the uplink reference signal to the network device using the first target waveform according to the second indication information.

19. The terminal device according to claim 18, wherein the processor is further configured to:
control the receiver to receive fourth indication information transmitted by the network device, wherein the fourth indication information is used to indicate a second target waveform determined by the network device from the at least two optional uplink waveforms according to the uplink reference signal; and
perform the uplink transmission using the second target waveform indicated in the fourth indication information.

20. The terminal device according to claim 11, wherein the first indication information occupies at least two bits, and wherein the at least two optional uplink waveforms comprise: orthogonal frequency division multiplexing (OFDM) and discrete Fourier transform spreading orthogonal frequency division multiplexing (DFT-s-OFDM).

* * * * *